(12) United States Patent
Bouw et al.

(10) Patent No.: US 11,038,812 B2
(45) Date of Patent: *Jun. 15, 2021

(54) AVAILABILITY MANAGEMENT FOR REFERENCE DATA SERVICES

(71) Applicant: Microsoft Technology Licensing, LLC, Redmond, WA (US)

(72) Inventors: Rene Jacco Bouw, Kirkland, WA (US); Lukasz Gwozdz, Seattle, WA (US); Moe Khosravy, Bellevue, WA (US); Christian Liensberger, Bellevue, WA (US); Roger Soulen Mall, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,598

(22) Filed: Dec. 12, 2019

(65) Prior Publication Data

US 2020/0120042 A1 Apr. 16, 2020

Related U.S. Application Data

(63) Continuation of application No. 15/337,655, filed on Oct. 28, 2016, now Pat. No. 10,511,541, which is a
(Continued)

(51) Int. Cl.
*G06F 15/16* (2006.01)
*H04L 12/927* (2013.01)
(Continued)

(52) U.S. Cl.
CPC .......... *H04L 47/803* (2013.01); *G06F 9/5061* (2013.01); *G06F 9/5072* (2013.01);
(Continued)

(58) Field of Classification Search
CPC ....... H04L 43/04; H04L 67/10; H04L 41/083; H04L 43/08; G06F 9/5077; G06F 9/547;
(Continued)

(56) References Cited

U.S. PATENT DOCUMENTS

| | | | |
|---|---|---|---|
| 6,975,619 B1 * | 12/2005 | Byers ................ | H04M 3/42357 370/351 |
| 8,429,049 B2 * | 4/2013 | Smith ..................... | H04L 47/70 705/35 |

(Continued)

OTHER PUBLICATIONS

"Non Final Office Action Issued in U.S. Appl. No. 16/701,227", dated Sep. 15, 2020, 7 Pages.
(Continued)

*Primary Examiner* — Chirag R Patel
(74) *Attorney, Agent, or Firm* — Fiala & Weaver P.L.L.C.

(57) ABSTRACT

Various aspects for scaling an availability of information are disclosed. In one aspect, a response performance associated with responding to data consumption requests is monitored. A characterization of the response performance is ascertained, and a scaling of resources is facilitated based on the characterization. In another aspect, a data consumption status indicative of data consumed is ascertained. Here, a scalability interface is provided, which displays aspects of the status, and receives an input from a content provider. An allocation of resources is then modified in response to the input. In yet another aspect, a response performance associated with responding to data consumption requests is monitored. An application programming interface (API) call is generated based on a characterization of the response performance, and transmitted to a content provider. An API response is then received from the content provider indicating whether a scaling of resources for hosting the data was performed.

20 Claims, 15 Drawing Sheets

Related U.S. Application Data continuation of application No. 12/907,979, filed on Oct. 19, 2010, now Pat. No. 9,483,313.

(51) Int. Cl.
    *H04L 12/24*     (2006.01)
    *H04L 29/08*     (2006.01)
    *H04L 12/26*     (2006.01)
    *G06F 9/50*     (2006.01)
    *G06F 9/54*     (2006.01)

(52) U.S. Cl.
    CPC ............ *G06F 9/5077* (2013.01); *G06F 9/547* (2013.01); *H04L 41/0813* (2013.01); *H04L 43/04* (2013.01); *H04L 43/08* (2013.01); *H04L 43/16* (2013.01); *H04L 67/02* (2013.01); *H04L 67/10* (2013.01); *H04L 67/1014* (2013.01); *H04L 67/1031* (2013.01); *H04L 67/1097* (2013.01); *H04L 67/2852* (2013.01)

(58) Field of Classification Search
    CPC ............... G06F 9/5061; G06F 11/3419; G06F 11/3442; G06F 11/3452; G06Q 10/06
    See application file for complete search history.

(56) References Cited

U.S. PATENT DOCUMENTS

| | | | | |
|---|---|---|---|---|
| 8,954,584 | B1* | 2/2015 | Subbarayan | H04L 67/1008 |
| | | | | 709/226 |
| 9,501,329 | B2* | 11/2016 | Spaltro | G06F 9/5072 |
| 2011/0040876 | A1* | 2/2011 | Zhang | G06F 11/3442 |
| | | | | 709/226 |
| 2011/0078303 | A1* | 3/2011 | Li | H04L 67/1012 |
| | | | | 709/224 |
| 2012/0072762 | A1* | 3/2012 | Atchison | G06F 9/5072 |
| | | | | 714/2 |

OTHER PUBLICATIONS

"Summons to Attend Oral Proceedings Issued in European Patent Application No. 11834812.7", dated Dec. 23, 2020, 9 Pages.

* cited by examiner

API: Application Programming Interface

AVAILABILITY MANAGEMENT FOR REFERENCE DATA SERVICES

CROSS-REFERENCE TO RELATED APPLICATIONS

This application is a continuation of U.S. patent application Ser. No. 15/337,655, filed Oct. 28, 2016, which is a continuation of U.S. patent application Ser. No. 12/907,979, filed Oct. 19, 2010. The entirety of each of these patent applications is incorporated by reference herein.

TECHNICAL FIELD

The subject disclosure relates to scaling resources to facilitate the availability of data in connection with providing information as a service.

BACKGROUND

By way of background concerning some conventional systems, computing devices have traditionally stored information and associated applications and data services locally to the device. Yet, with the evolution of on-line and cloud services, information is increasingly being moved to network providers who perform none, some or all of service on behalf of devices. The evolution of network storage farms capable of storing terabytes of data (with potential for petabytes, exabytes, etc. of data in the future) has created an opportunity to mimic the local scenario in a cloud, with separation of the primary device and the external storage.

However, no cloud service or network storage provider has been able to effectively provide information as a service on any platform, with publishers, developers, and consumers easily publishing, specializing applications for and consuming any kind of data, in a way that can be tracked and audited for all involved. In addition, due to the disparate number of content providers and their typically proprietary schemas for defining data, today, where disparate content providers do not coordinate their publishing acts to the cloud with one another, there is little opportunity to leverage the collective power of such disparate publishing acts.

Web services are typically built with a certain audience size in mind, wherein the data centers/infrastructure that host and make the data services available are built and resourced with these goals in mind. However, as Web services become more popular, increased consumption can bring such services down as a result of too many requests to read. Namely, there are sometimes insufficient resources to adequately respond to the increase in requests. Similarly, a content provider may over-allocate resources in circumstances where data consumption decreases, which results in the content provider unnecessarily paying for unused resources. As a result, today, dealing with significant increases or decreases in demand for web services for data is a fragmented problem with no common solution.

The above-described deficiencies of today's devices and data services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with providing information as a service from any platform. In one such aspect, a method that facilitates a scalable availability of information is provided. The method can include receiving a plurality of requests directed towards a consumption of data associated with a content provider. The embodiment further can include monitoring a response performance associated with responding to the plurality of requests, as well as determining a characterization of the response performance. A scaling of resources allocated for the data is then facilitated based on the characterization.

In another aspect, a method for facilitating a scalable availability of information is provided. A communication between a content provider and a server is established, and a data consumption status is ascertained. Here, the data consumption status is indicative of content provider data consumed via the server. The method can further include providing the content provider with a scalability interface. For this embodiment, the scalability interface displays at least one aspect of the data consumption status to the content provider, and also receives an input from the content provider. An allocation of data availability resources associated with the content provider is then modified in response to the input.

In yet another aspect, an additional method is provided which facilitates a scalable availability of information. This embodiment includes monitoring a response performance associated with responding to data consumption requests. Here, the data consumption requests are requests for data hosted by a content provider. The method further includes generating an application programming interface (API) call based on a characterization of the response performance, and transmitting the API call to the content provider. An API response is then received from the content provider, which indicates whether a scaling of resources for hosting the data was performed, and such that a processing of the data consumption requests is modified according to the scaling of resources.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, Web services are typically built with a certain audience size in mind, wherein the data centers/infrastructure that host and make the data services available are built and resourced with these goals in mind. However, as Web services become more popular, increased consumption can bring such services down as a result of too many requests to read, wherein there are insufficient resources to handle the responses, or other unpredictable variations can occur. If a global information marketplace is desired, it would be desirable for the architecture of such marketplace to overcome these limitations by providing a way for content providers to scale their data centers up or down, as appropriate, whether the data is hosted internal or external to the management system.

The various embodiments disclosed herein are directed to scale out systems and methods, as well as to interfaces used to communicate with content providers to facilitate such scaling of resources, and to the communications attendant to such systems, methods and interfaces.

Resource Scaling System

Figure 1:
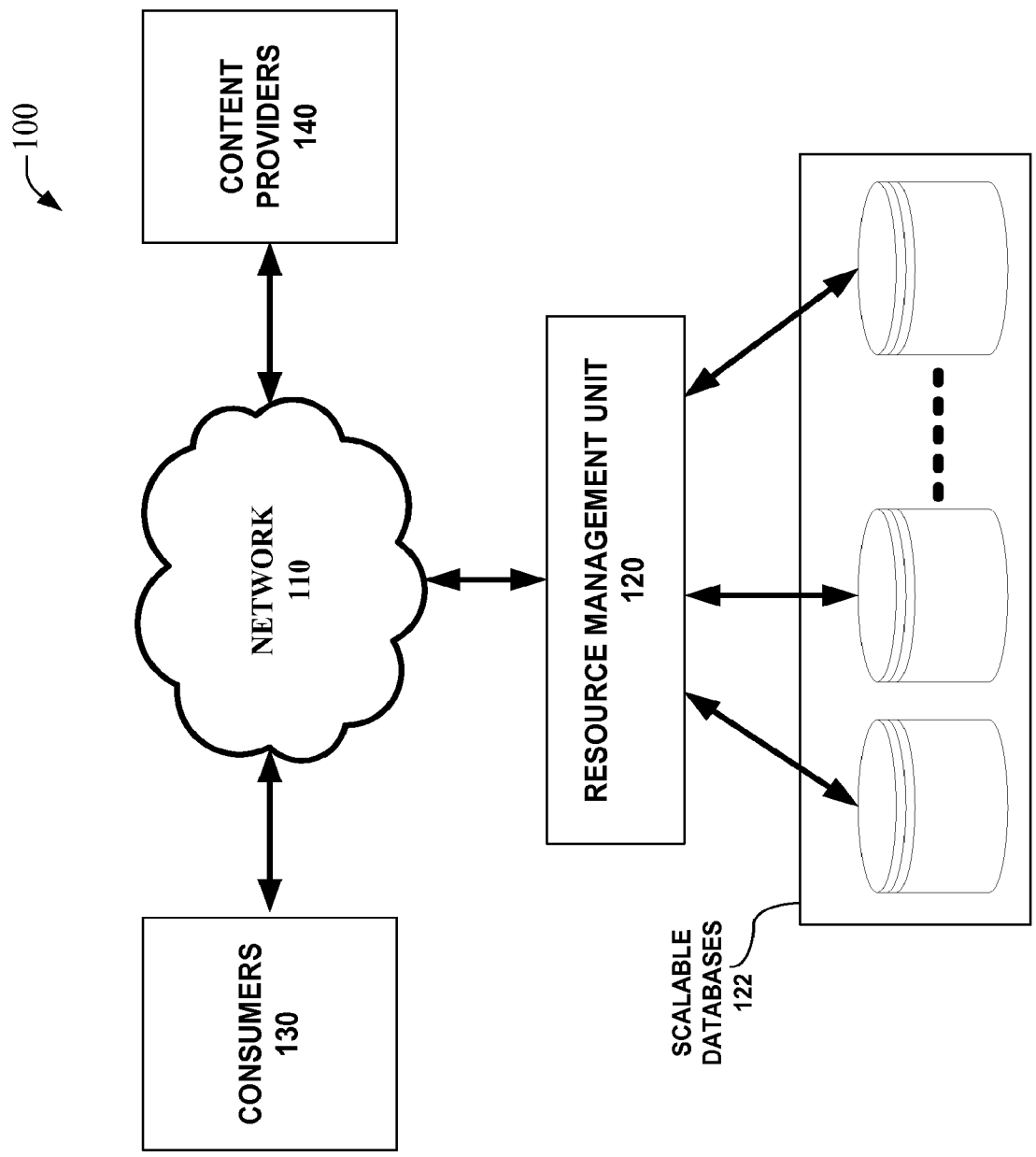
FIG. 1 illustrates an exemplary system that facilitates a scaling of resources according to an embodiment.

FIG. 1 illustrates an exemplary system that facilitates scaling of resources associated with information provided as a service from any platform. As illustrated, system 100 may include resource management unit 120, consumers 130, and content providers 140, which are communicatively coupled via network 110. Resource management unit 120 is configured to manage data consumption requests from consumers 130 for data associated with content providers 140. Moreover, resource management unit 120 can monitor the volume and/or status of data consumption requests corresponding to particular content providers, wherein resources allocated to such data can then be scaled appropriately. For instance, if the content provider's data is hosted by resource management unit 120, an internal scaling operation can be performed, wherein scalable databases 122 are removed and/or replicated appropriately. However, if the consumed data is hosted by content providers 140, and/or a third party, resource management unit 120 can notify content providers 140 of dips and/or spikes in response times so that content providers 140 can remove and/or replicate databases, e.g., create additional instances of databases, accordingly.

Figure 2:
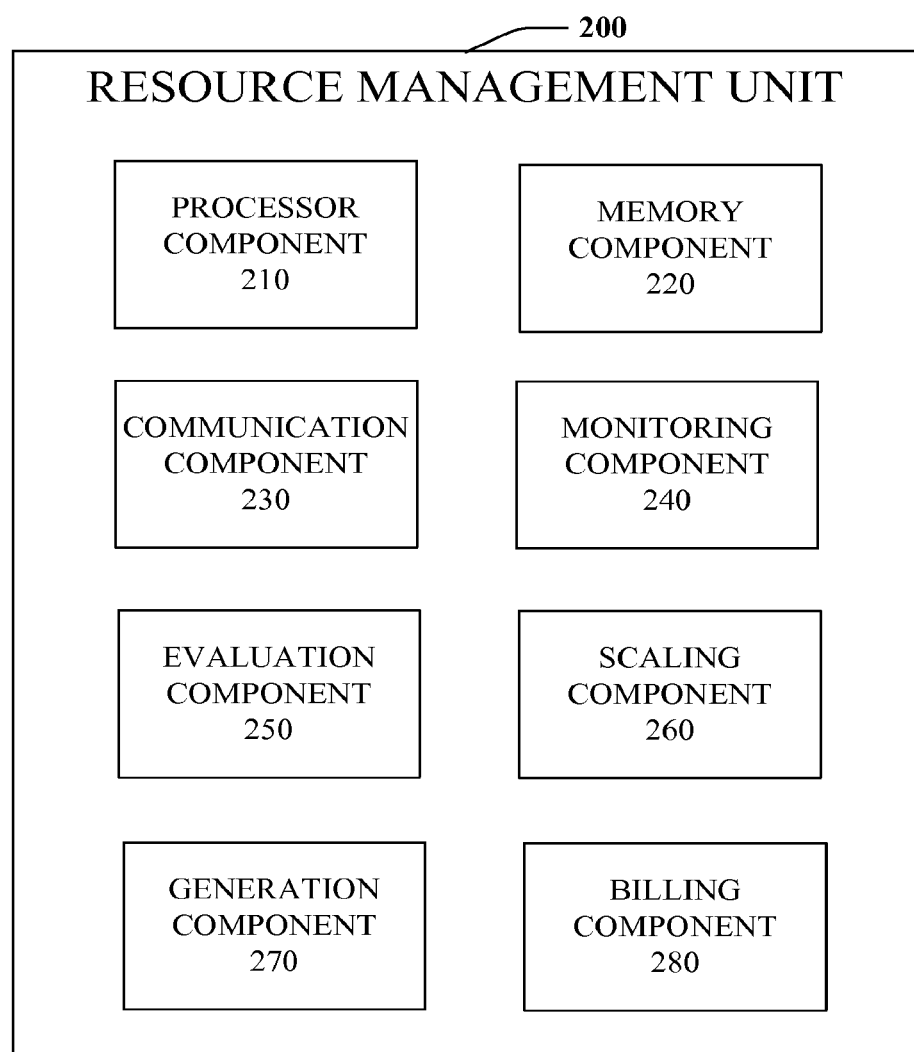
FIG. 2 is a block diagram illustrating an exemplary resource management unit that facilitates scaling resources according to an embodiment.

Referring next to FIG. 2, a block diagram of an exemplary resource management unit that facilitates a scalable availability of information according to an embodiment is provided. As shown, resource management unit 200 can include processor component 210, memory component 220, communication component 230, monitoring component 240, evaluation component 250, scaling component 260, generation component 270, and billing component 280.

In one aspect, processor component 210 is configured to execute computer-readable instructions related to performing any of a plurality of functions. Processor component 210 can be a single processor or a plurality of processors dedicated to analyzing information to be communicated from resource management unit 200 and/or generating information that can be utilized by memory component 220, communication component 230, monitoring component 240, evaluation component 250, scaling component 260, generation component 270, and/or billing component 280. Additionally or alternatively, processor component 210 can be configured to control one or more components of resource management unit 200.

In another aspect, memory component 220 is coupled to processor component 210 and configured to store computer-readable instructions executed by processor component 210. Memory component 220 can also be configured to store any of a plurality of other types of data including generated by any of communication component 230, monitoring component 240, evaluation component 250, scaling component 260, generation component 270, and/or billing component 280. Memory component 220 can be configured in a number of different configurations, including as random access memory, battery-backed memory, hard disk, magnetic tape, etc. Various features can also be implemented upon memory component 220, such as compression and automatic back up, e.g., use of a Redundant Array of Independent Drives configuration.

In yet another aspect, resource management unit 200 includes communication component 230, which is coupled to processor component 210 and configured to interface resource management unit 200 with external entities. For instance, communication component 230 can be configured to receive data consumption requests for data associated with a particular content provider.

As illustrated, resource management unit 200 can further include monitoring component 240 and evaluation component 250. Within such embodiment, monitoring component 240 is configured to monitor a response performance associated with responding to the data consumption requests, whereas evaluation component 250 is configured to ascertain a characterization of the response performance.

Resource management unit 200 can also include scaling component 260, which is configured to facilitate a scaling of resources allocated for the data based on the characterization. To this end, it is noted that scaling component 260 can be configured to facilitate such scaling in any of a plurality of ways. For instance, it is contemplated that scaling component 260 can be configured to facilitate a scaling of resources performed external to resource management unit 200. Indeed, since it is contemplated that content providers themselves can host their data, scaling component 260 can be configured to generate response performance status messages, which are communicated to the content provider via communication component 230. In a particular embodiment, generation component 270 can be included and configured to generate an application programming interface (API) call to the content provider, wherein the API call includes a request associated with the at least one aspect of the response performance, e.g., a warning message, a mandatory scaling message, etc. An API response to the request can then be received from the content provider, wherein the response identifies a scaled set of locations associated with the data, e.g., locations of additional databases allocated by the content provider.

Scaling component 260, however, can also be configured to facilitate a scaling of resources performed within resource management unit 200. Within such embodiment, resource management unit 200 hosts the content provider's data within a set of replicated databases, such that scaling component 260 is configured to scale resources by removing and/or adding a replica database. Content providers can also be provided with a scalability interface to facilitate receiving instructions from the content provider associated with the scaling of resources allocated to the content provider.

In a further aspect, resource management unit 200 includes billing component 280. Within such embodiment, billing component 280 can be configured to monetize the scaling of resources allocated to the content provider. Moreover, it is contemplated that costs associated with scaling resources, either up or down, can be automatically quantified. Accordingly, actual and/or hypothetical costs associated with the scaling of resources can be made readily available via billing component 280.

Figure 3:
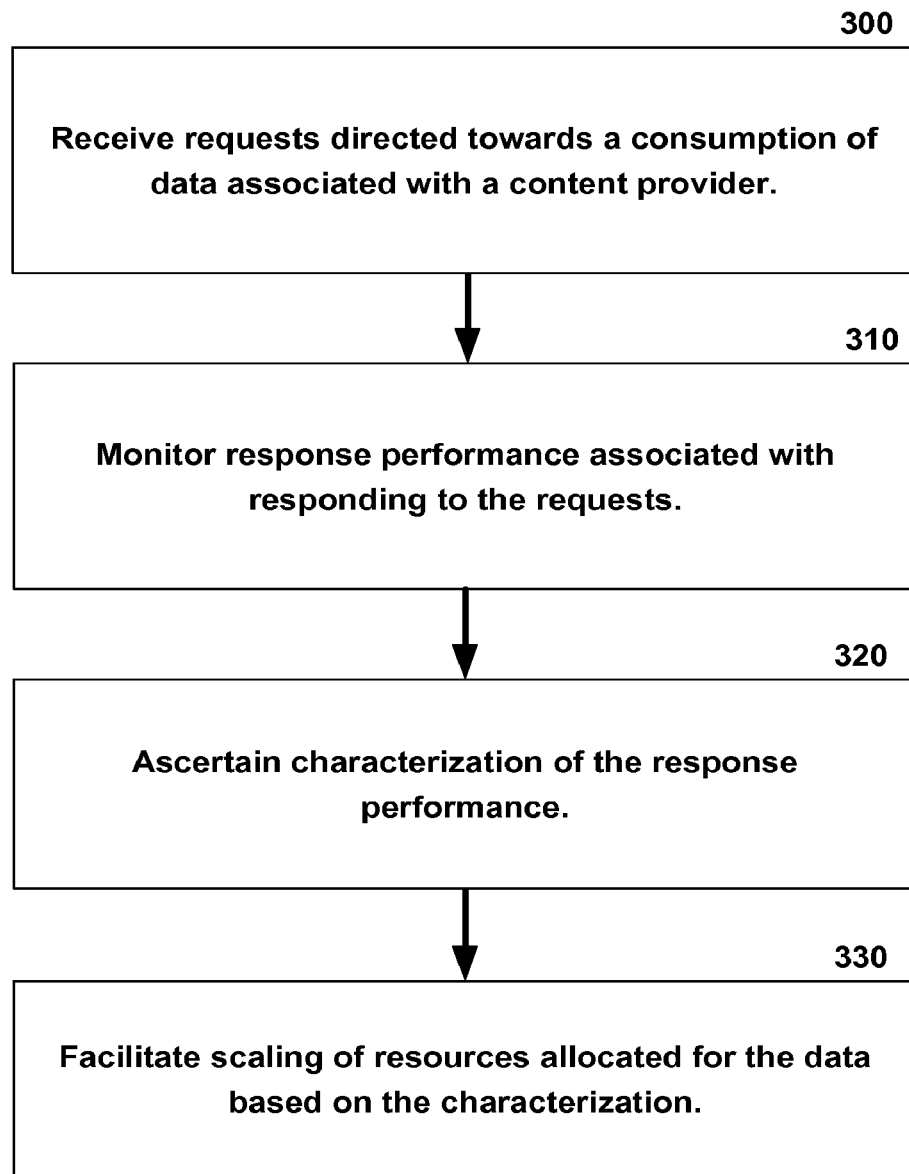
FIG. 3 is a flow diagram illustrating an exemplary non-limiting embodiment for scaling resources according to an embodiment.

FIG. 3 is a flow diagram illustrating an exemplary non-limiting embodiment for scaling resources according to an embodiment. At 300, requests directed towards a consumption of data associated with a content provider are received. A response performance associated with responding to the requests is then monitored at 310, followed by a characterization of the response performance at 320. A scaling of resources allocated for the data is then facilitated based on the characterization at 330.

Figure 4:
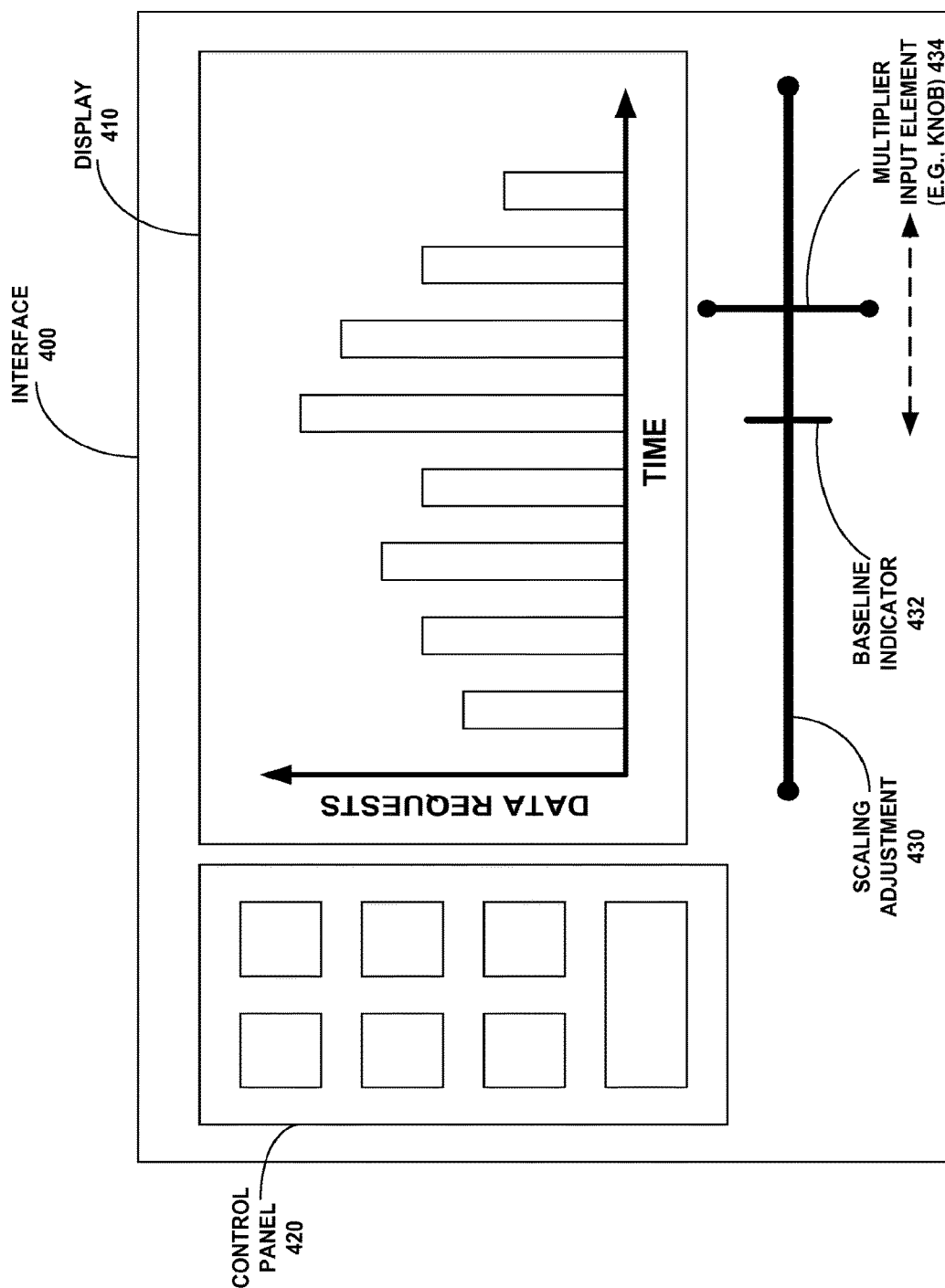
FIG. 4 illustrates an exemplary interface that facilitates scaling resources according to an embodiment.

FIG. 4 illustrates an exemplary interface that facilitates a scaling of resources according to an embodiment. As illustrated, interface 400 can include display 410, control panel 420, and scaling adjustment 430. For this particular embodiment, it is contemplated that interface 400 is provided to content providers so that they can seamlessly scale resources, as desired. To this end, display 410 can be configured to display any of various aspects associated with processing data consumption requests, either currently, in the future, or in the past. For example, a graphical representation of a number of data requests received over time can be displayed, as shown. Control panel 420 can then be used to toggle between different parameters including, for example, different business metrics (e.g., costs over time, rather than number of data requests) and/or different display types (e.g., different graph types).

As illustrated, interface 400 can also include scaling adjustment 430. Here, since content providers can prefer to scale resources in terms of business metrics, e.g., costs, number of requests, etc., scaling adjustment 430 can be included, wherein content providers simply slide multiplier knob 434 across scaling adjustment 430, as desired. For example, a baseline indicator 432 can be provided, wherein sliding multiplier knob 434 to the right increases a business metric multiplier, e.g., scales resources up, whereas sliding multiplier knob 434 to the left decreases a business metric multiplier, e.g., scales resources down.

Figure 5:
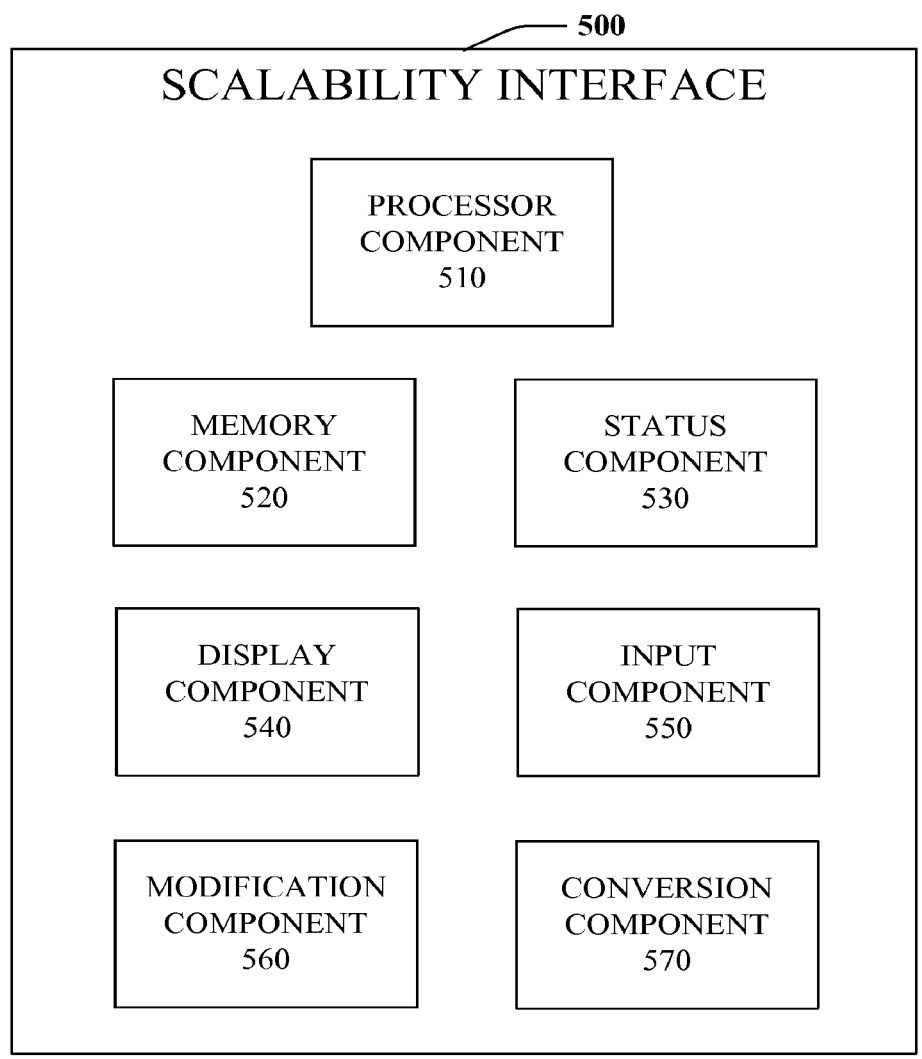
FIG. 5 is a block diagram illustrating an exemplary scalability interface that facilitates scaling resources according to an embodiment.

Referring next to FIG. 5, a block diagram illustrates an exemplary scalability interface that facilitates scaling resources in accordance with various aspects. As illustrated, scalability interface 500 can include processor component 510, memory component 520, status component 530, display component 540, input component 550, modification component 560, and conversion component 570.

Similar to processor component 210 in resource management unit 200, processor component 510 is configured to execute computer-readable instructions related to performing any of a plurality of functions. Processor component 510 can be a single processor or a plurality of processors dedicated to analyzing information to be communicated from scalability interface 500 and/or generating information that can be utilized by memory component 520, status component 530, display component 540, input component 550, modification component 560, and/or conversion component 570. Additionally or alternatively, processor component 510 can be configured to control one or more components of scalability interface 500.

In another aspect, memory component 520 is coupled to processor component 510 and configured to store computer-readable instructions executed by processor component 510. Memory component 520 can also be configured to store any of a plurality of other types of data including data generated by any of status component 530, display component 540, input component 550, modification component 560, and/or conversion component 570. Here, it is noted that memory component 520 is analogous to memory component 220 in resource management unit 200. Accordingly, it can be appreciated that any of the aforementioned features/configurations of memory component 220 are also applicable to memory component 520.

As illustrated, scalability interface 500 can also include status component 530 and display component 540. Within such embodiment, status component 530 is configured to ascertain a data consumption status indicative of content provider data consumed, whereas display component 540 is configured to display any of various aspects of the data consumption status to the content provider. Here, it is contemplated that such aspects of the data consumption status can be displayed in any of a plurality of ways. For instance, display component 540 can be configured to provide a graphical representation of the data consumption status, e.g., a bar graph tracking a number of data requests over time.

Scalability interface 500 can further include input component 550 and modification component 560. Within such embodiment, input component 550 is configured to receive an input from a content provider, whereas modification component 560 is configured to modify an allocation of data availability resources associated with the content provider in response to the input. To facilitate such modifications, scalability interface 500 can also include conversion component 570, which is configured to perform a conversion between scalability metrics and business metrics. Moreover, a particular business metric is convertible into a corresponding scalability metric, whereas a particular scalability metric is convertible into a corresponding business metric. In an aspect, scalability metrics can be associated with any of a plurality of metrics directly related to a processing of the content provider's data consumption, e.g., a capacity to process a number of queries per unit of time, whereas business metrics can be associated with any of a plurality of business-related metrics, e.g., a demand associated with the content provider data, a cost of hosting a scaled amount of the content provider data, etc. Indeed, since content providers can prefer to enter business metrics rather than scalability metrics, various tools for toggling between such metrics can be provided. For instance, in an aspect, input component 550 can be configured to receive the content provider's input as a multiplier of a desired business metric, wherein conversion component 570 is configured to convert the desired business metric into a corresponding scalability metric based on the multiplier. To this end, input component 550 can be implemented as a multiplier knob, wherein the multiplier is ascertained from the content provider via the multiplier knob.

Figure 6:
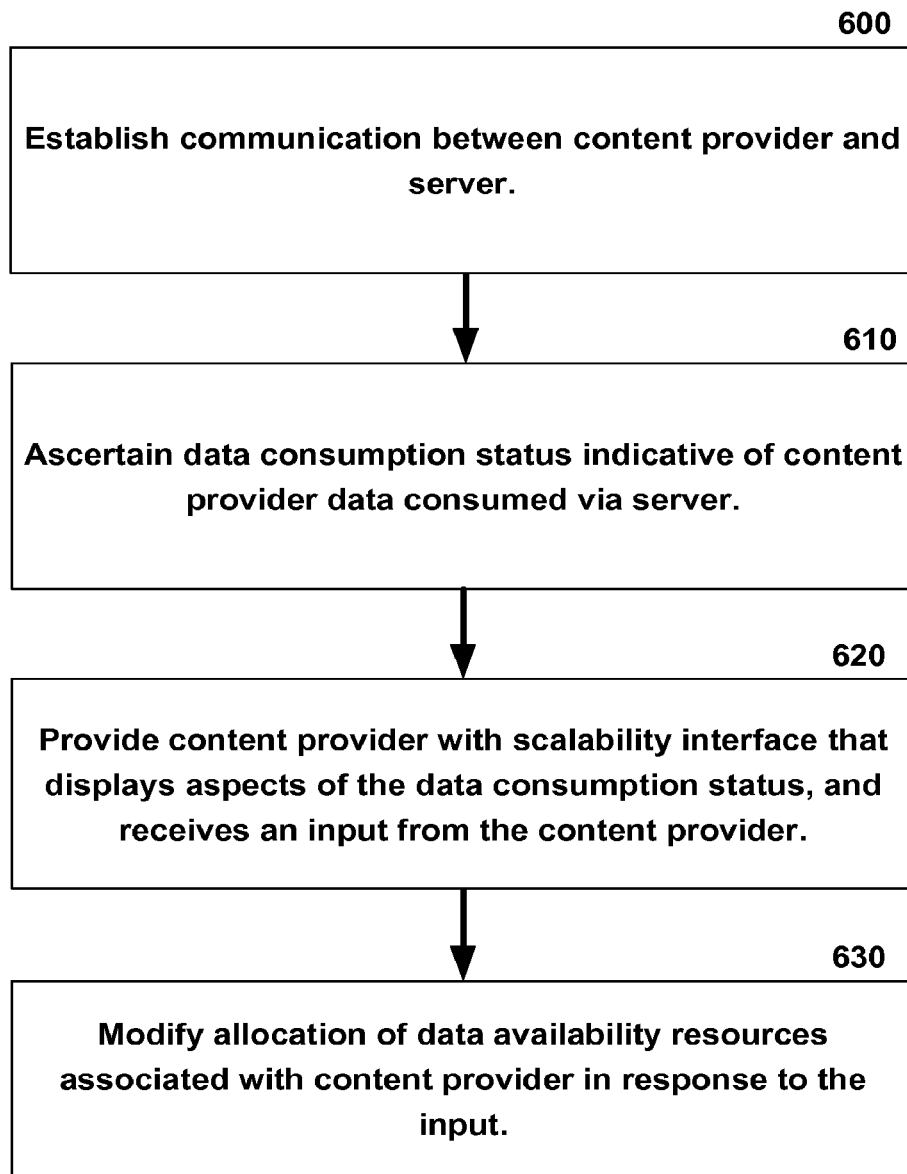
FIG. 6 is a flow diagram illustrating an exemplary non-limiting embodiment for providing an interface to facilitate scaling resources according to an embodiment.

FIG. 6 is a flow diagram illustrating an exemplary non-limiting embodiment for providing a user interface to scale resources according to an embodiment. At 600, a communication between a content provider and a server is established. Next, at 610, a data consumption status is ascertained, which is indicative of content provider data consumed via the server. A scalability interface is then provided to the content provider at 620, which displays aspects of the data consumption status, and also receives an input from the content provider. An allocation of data availability resources associated with the content provider is then modified in response to the input at 630.

Figure 7:
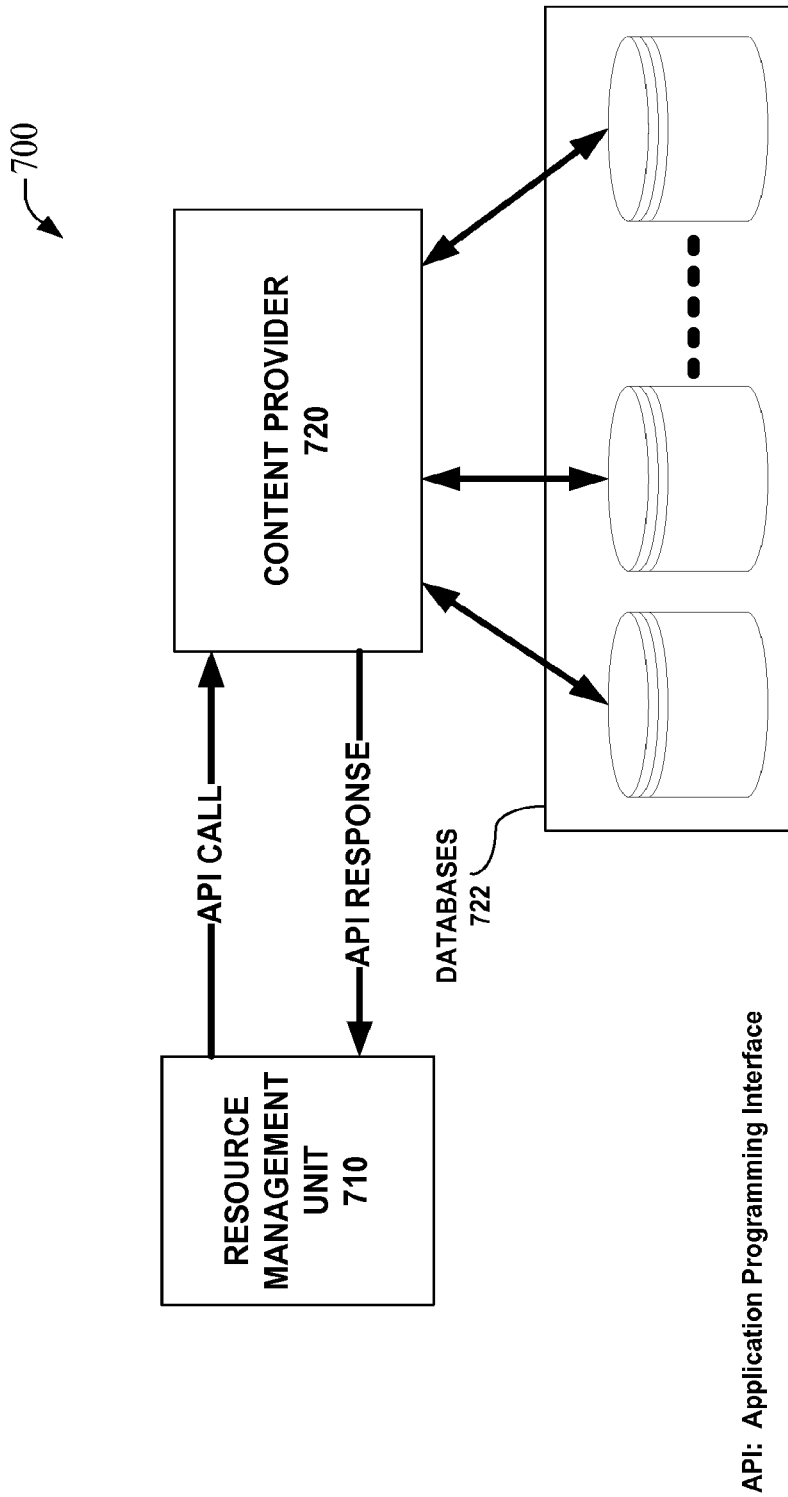
FIG. 7 illustrates an exemplary system that facilitates an external scaling of resources according to an embodiment.

FIG. 7 illustrates an exemplary system that facilitates an external scaling of resources according to an embodiment. For this particular embodiment, resource management unit 710 is configured to manage data consumption requests for data hosted by content providers 720 and/or a third party within scalable databases 722. Moreover, resource management unit 710 can be configured to notify content providers 720 of response performance associated with a consumption of the content provider's data so that content providers 720 can remove and/or replicate scalable databases 722 accordingly. In an aspect, resource management unit 710 can transmit API calls to content providers 720, wherein API responses to those API calls are subsequently provided to resource management unit 720. For example, API call indicating that a particular performance threshold has been exceeded can be provided to content providers 720, wherein an API response can then be provided to resource management unit 710 indicating if/how a scaling of scalable databases 722 has been performed, e.g., providing a location of new replicated databases.

Figure 8:
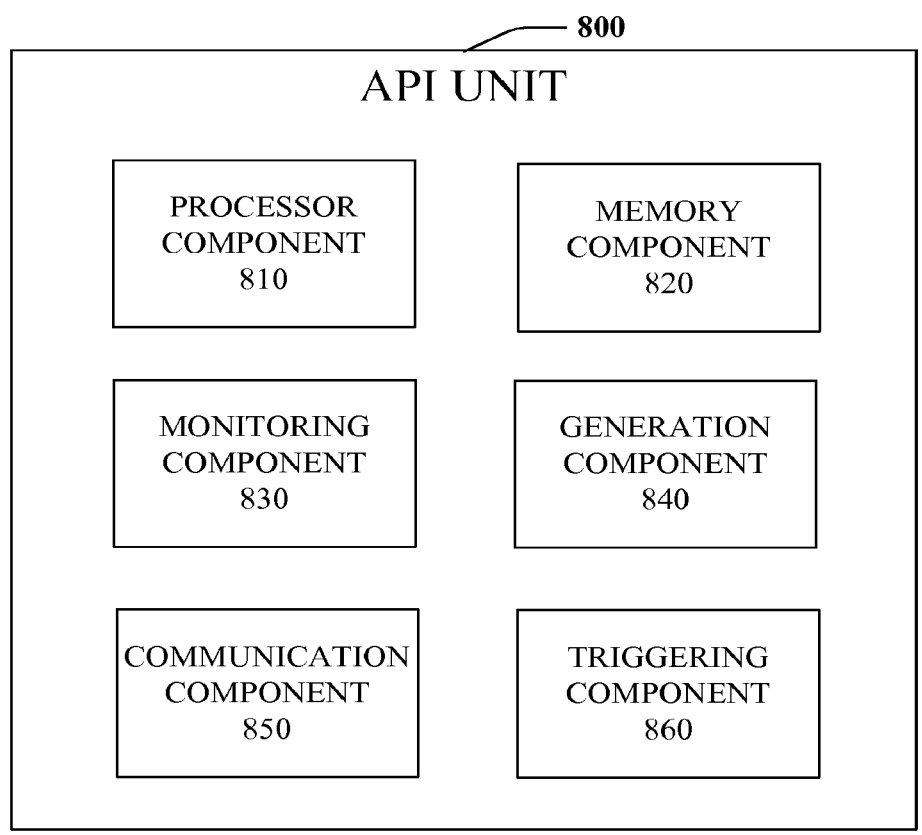
FIG. 8 is a block diagram illustrating an exemplary application programming interface (API) unit that facilitates scaling resources according to an embodiment.

Referring next to FIG. 8, a block diagram illustrates an exemplary application programming interface (API) unit that facilitates scaling resources in accordance with various aspects. As illustrated, API unit 800 can include processor component 810, memory component 820, monitoring component 830, generation component 840, communication component 850, and triggering component 860.

Similar to processor components 210 and 510 in resource management unit 200 and scalability interface 500, respectively, processor component 810 is configured to execute computer-readable instructions related to performing any of a plurality of functions. Processor component 810 can be a single processor or a plurality of processors dedicated to analyzing information to be communicated from API unit 800 and/or generating information that can be utilized by memory component 820, monitoring component 830, generation component 840, communication component 850, and/or triggering component 860. Additionally or alternatively, processor component 810 can be configured to control one or more components of API unit 800.

In another aspect, memory component 820 is coupled to processor component 810 and configured to store computer-readable instructions executed by processor component 810. Memory component 820 can also be configured to store any of a plurality of other types of data including data generated by any of monitoring component 830, generation component 840, communication component 850, and/or triggering component 860. Here, it is noted that memory component 820 is analogous to memory components 220 and 520 in resource management unit 200 and scalability interface 500, respectively. Accordingly, it can be appreciated that any of the aforementioned features/configurations of memory components 220 and 520 are also applicable to memory component 820.

As illustrated, API unit 800 can also include monitoring component 830 and generation component 840. Within such embodiment, monitoring component 830 is configured to monitor a response performance associated with responding to data consumption requests for data hosted by a content provider, whereas generation component 840 is configured to generate an API call based on a characterization of the response performance.

In another aspect, API unit 800 includes communication component 850, which is coupled to processor component 810 and configured to interface API unit 800 with external entities. For instance, communication component 850 can be configured to transmit the API call generated by generation component 840 to the content provider. Communication component 850 can also be configured to receive an API response from the content provider, wherein such response indicates whether a scaling of resources for hosting the data was performed. Within such embodiment, a processing of the data consumption requests can then be modified according to the scaling of resources.

In a further aspect, it is contemplated that API calls are generated/transmitted according to a tiered characterization of the response performance. Within such embodiment, triggering component 860 can be included, wherein triggering component 860 is configured to determine when the response performance exhibits a particular characterization based on any of a plurality of tiered performance thresholds. For instance, triggering component 860 can be configured to detect a triggering of a warning threshold, wherein the API call includes a warning message indicating that the response performance has exceeded a pre-determined "warning" threshold, e.g., at 25% slowdown.

Triggering component 860 can also be configured to detect a triggering of a mandatory scaling threshold, wherein the API call includes a mandatory scaling message indicating that the response performance has exceeded a pre-determined "mandatory scaling" threshold, e.g., at 50% slowdown. Here, it is noted that particular details can be included in the API call and/or API response to facilitate such a mandatory scaling threshold. For instance, the API call can include an indication of a current number of replicas of the data, a response time associated with the triggering of the mandatory scaling threshold, and/or an average response time, whereas the API response can include an indication of a new number of replicas of the data, a location of a new data source associated with the data, and/or a status of a scaling procedure, performed by the content provider and/or a third party associated with the content provider.

More severe tiers are also contemplated, e.g., at 50% slowdown. For instance, triggering component 860 can be configured to detect a triggering of a policy modification threshold. Within such embodiment, in response to the triggering of the policy modification threshold, a processing of the data consumption requests can include a modification of a cache policy associated with the data consumption requests.

Figure 9:
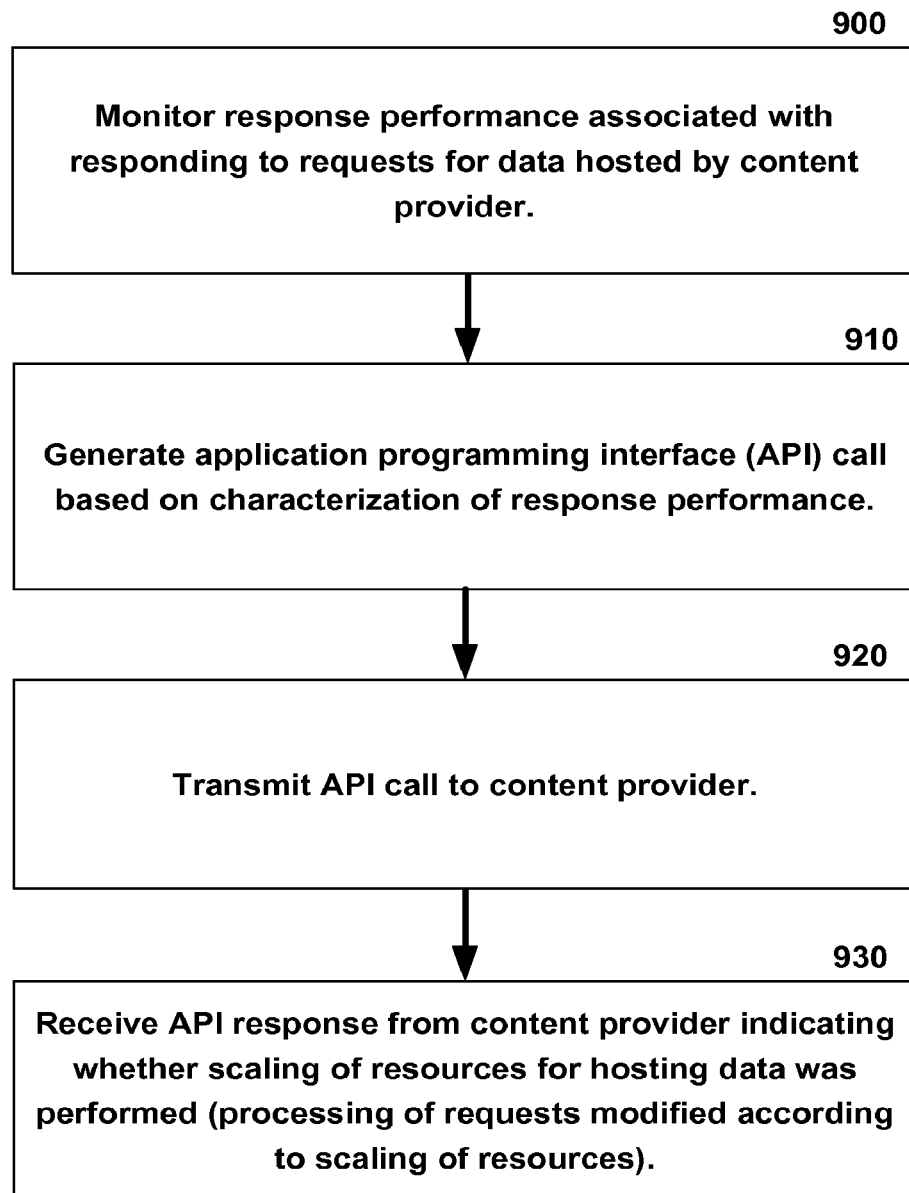
FIG. 9 is a flow diagram illustrating an exemplary non-limiting embodiment for scaling resources according to an embodiment.

FIG. 9 is a flow diagram illustrating an exemplary non-limiting embodiment for providing a user interface to scale resources according to an embodiment. At 900, a response performance associated with responding to data consumption requests is monitored. For this particular embodiment, the data consumption requests are requests for data hosted by a content provider. An application programming interface (API) call is then generated at 910 based on a characterization of the response performance. Next, at 920, the API call is transmitted to the content provider. An API response is then received from the content provider at 930, which indicates whether a scaling of resources for hosting the data was performed. Within such embodiment, a processing of the data consumption requests is modified according to the scaling of resources.

Supplemental Context for Information as a Service

The following description contains supplemental context regarding potential non-limiting infrastructure, architectures and/or associated services to further aid in understanding one or more of the above embodiments. Any one or more of any additional features described in this section can be accommodated in any one or more of the embodiments described above with respect to updating of data set semantics and corresponding access APIs for information as a service from any platform. While such combinations of embodiments or features are possible, for the avoidance of doubt, no embodiments set forth in the subject disclosure are to be considered limiting on any other embodiments described herein.

By way of some additional background, today, while information can be obtained over networks, such as the Internet, today's offerings tend to the proprietary in terms of access and framework, and are thus limited in terms of third party provider participation. For instance, currently, there is no adequate business model for commercial content providers to publish their data in a way that does not relinquish at least some of the value of such commercial content, and thus historically, owners of valuable content have tended to expose that content through limited proprietary means. Or, in instances where storage of such content is provided by secure cloud storage providers, there is little value in storage alone when a consumer wades through thousands of tables to potentially find an item of interest as a result. In addition, even where cloud storage providers attempt to collect data from various providers, at best such providers can boast a modest, small or incomplete catalog of data.

Much of the stunting of potential growth in this area has been the result of mistrust over handling and IP, e.g., copyrights. In short, big players don't trust cloud providers with crown jewels because a single compromise can end the value of the data. In addition, such cloud providers to date have had a weak position with respect to information workers who wish to extract value from such data for their informational needs, and in addition, due to the proprietary nature of such systems, developers have thus far had limited ability to expand tools for developing informational capabilities.

Accordingly, as described for one or more embodiments, an infrastructure for information as a service is provided that accommodates all classes of individuals: publishers, developers, information workers, and consumers. The infrastructure enables information discovery, e.g., the ability to discover, acquire, and consume structured and blob datasets to power any application—on any platform and any form factor, e.g., any screen size. The infrastructure further enables brokerage business, e.g., a partner driven ecosystem and global reach to deliver data and functionality to developers and information workers. The infrastructure also allows analytics and reporting, e.g., a single click analysis to augment private data with public data. In this regard, due to the open nature of various implementations of the infrastructure, any application developer can develop mobile, cloud, and/or desktop applications to facilitate the publishing, processing, querying and/or retrieval of data.

To write applications, one can register for account information, e.g., sign in with Live ID, and be provided with an account key by which to access the "blob" via structured and real-time web services enabled for the infrastructure for information as a service as described for one or more embodiments herein. In one aspect, developers can explore the APIs visually before coding begins. For instance, a service explorer module or set of modules can be used by developers to visually construct representational state transfer (REST) API queries and preview the content according to a variety of packages, such as, but not limited to extensible markup language (XML), ATOM, RAW (for blob and real-time content), or in a table view, e.g., for structured data. For example, a developer merely provides his or her account key and selects to preview the content.

Accordingly, developers can build mobile, desktop or service applications on any platform. While resulting REST queries can be copied into a new developer application, the infrastructure for information as a service also enables the ability to consume automatically generated C # proxy classes to eliminate any need to create a local object model or generate and understand the details of XML or web service code. In this regard, in another non-limiting beneficial aspect, a developer can download the proxy classes and include them in the developer's applications to consume service data with as few as a couple lines of code.

In this regard, the various embodiments of an infrastructure for information as a service allow developers and information workers to find, acquire, and consume data in their applications and analytics scenarios instantly, periodically, or over some other function of time specified by the application developer. As mentioned, a developer obtains an account key which then accompanies web services calls to the network services enabling information as a service as described for one or more embodiments herein for content requests and subscribing to the content of interest.

Thus, in one aspect, the account key provided by the infrastructure for information as a service as described for one or more embodiments herein is the developer's private key. This key enables billing and reporting on content used in connection with the developer's applications. As such, this private developer key is not to be shared without purpose, and precautions in securing the key are to be taken where developing native applications running on mobile or desktop solutions and planning to integrate the key as part of the deployment. For example, cryptographic storage can be used to ensure the key is not cracked.

In addition to the account key, which is used to track the application consuming the content, the user ID can be a unique user ID that is a globally unique identifier (GUID) that represents the developer's individual users. This field allows billing for content that is priced on a per-user basis programmatically. For example, if a developer is developing a mobile application with an individual user consuming the application, the developer returns the same GUID each time requests are made on behalf of that individual user. However, if the developer is developing a web portal and issuing web service requests on behalf of a variety of users, it is up to the developer to assign a new GUID for each user visiting the portal. For example, each registered user can be assigned a GUID or each IP address/port combination can be assigned a user ID GUID, etc.

While REST APIs can be constructed on any platform to consume content from the infrastructure for information as a service as described for one or more embodiments herein, in one embodiment, proxy classes can be dynamically generated for services in C #. Achieving this is a matter of downloading the object models, adding them to the current developer project, and updating the account and user values, e.g., unique user values.

If a developer would like to issue requests manually, an example is provided below, but for any service, the preview function can be used, or the URLs created from the Service Explorer can be invoked as well. An exemplary, non-limiting REST query to a sample dataset is illustrated below. It is noted that some or all calls can be secure socket layer (SSL) secured.

https://api.sqlazureservices.com/UnService.svc/UNESCO(120)

The $accountKey and $uniqueUserId elements are also placed in the header of the request, which appears as follows, for example:

$accountKey={developer account key}
$uniqueUserID={a GUID representing the user}

The value in $accountKey represents the developer's account key, found in the Accounts Tab and the value in $uniqueUserID represents the GUID for the user accessing the service.

The above example authenticating approach is non-limiting in that other authenticating approaches are also possible, and thus the various embodiments described herein can implement any alternative authentication approaches. For instance, Basic Authorization (RFC 1945), with the AccountKey as the password, or Access Control Server (ACS) using a token based approach, or other token based approaches can be used as well.

Accordingly, the infrastructure for information as a service as described for one or more embodiments herein is a new service or framework allowing developers and information workers to easily discover, purchase, and manage premium data subscriptions in any platform. The infrastructure is an information marketplace that brings data, imagery, and real-time web services from leading commercial data providers and authoritative public data sources, as well as non-authoritative publishers, together into a single or multiple locations that are unified under a common provisioning and billing framework. Additionally, developers and information workers can consume this premium content with virtually any platform, application or business workflow.

Some exemplary, non-limiting scenarios for using the infrastructure for information as a service as described for one or more embodiments herein include: (a) finding premium content to next-generation "killer apps" for consumer and business scenarios, (b) discovering and licensing valuable data to improve existing applications or reports, (c) bringing disparate data sets together in innovative ways to gain new insight into business performance and processes, e.g., aggregation algorithms, (d) instantly and visually exploring APIs across all content providers for blob, structured, and real-time web services and (e) consuming third party data inside existing applications and data base systems, such as existing word processing, spreadsheet, database query systems, etc., for rich reporting and analytics.

Benefits for developers include: (a) trial subscriptions allow content to be investigated and applications to be developed without paying data royalties, (b) simple transaction and subscription models allow "pay as you go or grow" access to multi-million dollar datasets, (c) consistent REST based APIs across datasets facilitate development on any platform, (d) visually building and exploring APIs, previewing results and (e) automatic C # proxy classes provide instant object models and eliminate the need to write tedious XML and web service code.

Benefits for Information Workers include: (a) integration with PowerPivot to easily work with data in existing spreadsheet software such as, but not limited to, Excel, (b) simple, predictable licensing models for acquiring content and (c) the ability to consume data from SQL Server, SQL Azure Database, and other pre-existing assets.

Benefits for Content Partners include: (a) easy publication and on-boarding process regardless of blob data, structured data, or dynamic web services, (b) developer tooling on the selected platform to ease development, e.g., via Visual Studio and .NET or other runtime system development, (c) exposing developer content to global developer and information worker community, (d) content discovery and integration inside pre-existing content consumption applications and (e) a scalable cloud computing platform handles storage, delivery, billing, and reporting on behalf of all parties.

In a non-limiting implementation of the infrastructure for information as a service as described for one or more embodiments herein, some features for Rich Web Services include: (a) secure, REST based model for consuming services across the entire content catalog, (b) dynamic pagination built into the APIs to simplify access, (c) Standard ATOM 1.0 feeds are available for most of the services and (d) consistent billing, provisioning, and usage reporting across all services.

In a non-limiting implementation of the infrastructure for information as a service as described for one or more embodiments herein, some features for a Service Explorer component include: (a) C # proxy classes generated to simplify development, (b) preview of data in tabular form and as a feed, such as an ATOM 1.0 feed, if supported, (c) invocation of the service to understand the results that the compiled service call returns, (d) discovery of documentation and sample values for each of the parameters and (e) instant copying of the visually built URL for a service call into clipboard to ease development.

In a non-limiting implementation of the infrastructure for information as a service as described for one or more embodiments herein, some features for a Marketplace Integration and Discovery Portal component include: (a) discovery of new data across domains including consumers and businesses, (b) management of service subscriptions and usage limits, (c) management of account keys to access the services and (d) detailed access reporting containing the services/datasets that were accessed, grouped by date and by account key.

The infrastructure provides a variety of value propositions for content owners, application developers/ISVs and for information workers and other consumers/subscribers. For content owners, the infrastructure enables monetization from data (for data providers who charge for the data), in addition to social benefits for data providers who do not charge for data, but derive benefit from the publication of such data in other ways. Due to the openness of the infrastructure, content owners enjoy greater availability and reach of data to ISVs and consumers/information workers, and all of this comes at a lower cost, particularly over developing a proprietary model as in the past.

For application developers/ISVs, the infrastructure enables access to data in a consistent format, variable and low-cost pricing model for data access. Predictable pricing, profit potential from consumers/IWs using the applications built using the data, broader reach to consumers through any platform and a single billing and data source For information workers/consumers, the infrastructure enables added value from applications, consumption of data in current large object (LOB) or IW software, a variable and low-cost pricing model for data access in addition to a single billing and data source.

Accordingly, the infrastructure solves a current customer and developer pain point with a potentially significant revenue upside, creates business intelligence opportunities attached with instant data for modeling, reporting, analysis and trending and creates adoption and stickiness for any platform by encouraging data owners to store their data via the infrastructure, thereby differentiating the infrastructure's value proposition when compared with conventional cloud storage environments.

Figure 10:
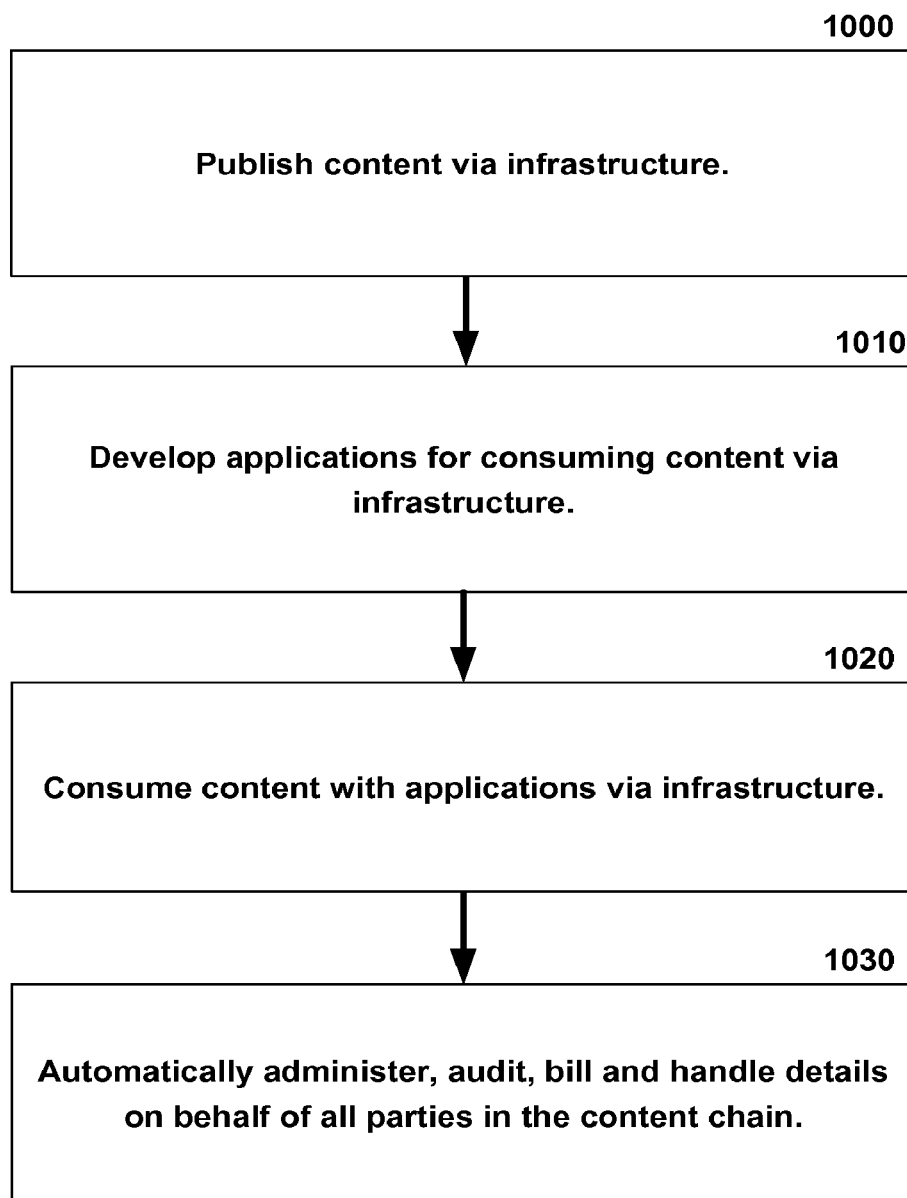
FIG. 10 is a flow diagram illustrating an exemplary sequence for a non-limiting infrastructure for information provided as a service from any platform.

As shown in the flow diagram of FIG. 10, at 1000, described herein are various ways for content owners or publishers to publish data via the infrastructure. At 1010, there are a variety of tools that allow developers to developer applications for consuming the data via the infrastructure. At 1020, consumers or information workers use the applications or can directly query over the data to consume the data. Lastly, the infrastructure provides a rich variety of tools at 1030 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 11:
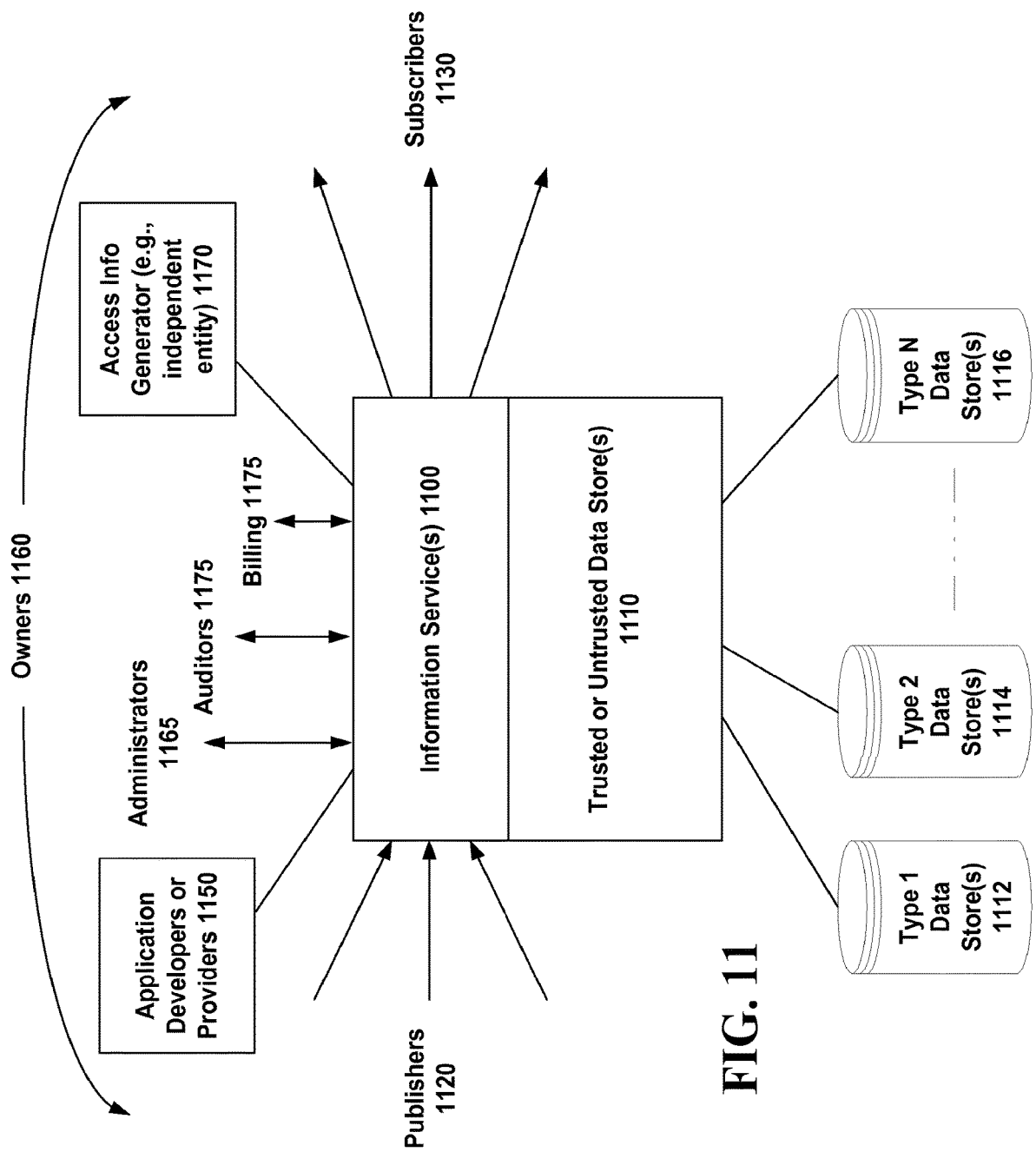
FIG. 11 is a block diagram illustrating an exemplary non-limiting infrastructure for information provided as a service from any platform.

FIG. 11 is a block diagram generally illustrating the various parties that can participate in an ecosystem providing information as a service as described herein. For instance a set of network accessible information services 1100 provide access to a variety of trusted or untrusted data stores 1110, depending on the sensitivity or other characteristics of the data. As shown, thus, what type of data store, 1112, 1114, . . . , 1116 is not so important since the ecosystem supports any kind of data, blob, structured, unstructured, etc. As mentioned, the system includes publishers 1120 that add data to the ecosystem, subscribers 1130 that consume the data and application developers or providers 1150 who help consumption of the data with their applications. An access information generator 1170 can also govern access to the data by various parties through maintaining or enforcing account information, key information, etc. In this respect, content owners 1160 can span any of the roles in that a content owner 1160 can be a publisher 1120, a subscriber 1130 and/or an application developer as well. In one aspect, the common infrastructure for all parties enables administration 1165, auditing 1175, billing 1175 as well as other desired ancillary services to the data transactions occurring across the infrastructure.

In this regard, various embodiments for the user friendly data platform for enabling information as a service from any platform is an infrastructure to enable consumers of data (IWs, developers, ISVs) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling") and BW, and further supports Data fees as a brokerage fee on a per-logical transaction basis (per report, per API, per download, etc.).

For Information Workers (e.g., Office, SQL Server, Dynamics users), the infrastructure supports subscriptions to allow for future EA integration as well as predictable spend requirements (as well as caching to support on and off-premise BI as well as "HPC" workloads). Thus, alternatives include content priced per-user per-month; which may or may not bundle to deliver content packs or per-transaction pricing, e.g., allowing cloud reporting/business intelligence on-demand pricing to eliminate the need to move large amounts of data while allowing per-usage pricing, or vertical apps via report galleries.

For content providers (any data type; any cloud), using any platform, the infrastructure becomes a value proposition to incent sales within any particular desired platform; auto-scaling, higher level SLA possibilities at no additional cost. For some non-limiting examples, data can be secure and associated data in the following domains: Location aware services & data, Commercial and residential real estate, Financial data and services, etc. A non-limiting scenario can include delivery of data to top 30 non-governmental organization (NGO) datasets. In addition, the infrastructure can include the ability to showcase BI & visualization through "Bing for information as a service", HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage, (SA, platform dependency, bandwidth) and content can be represented as merchandise (e.g., optimize content providers to cover COGS, maximize profits from IWs and developers). In various embodiments, an onboarding process can be implemented with quality bars for data and services, as well as accommodation of service level agreements (SLAs).

Figure 12:
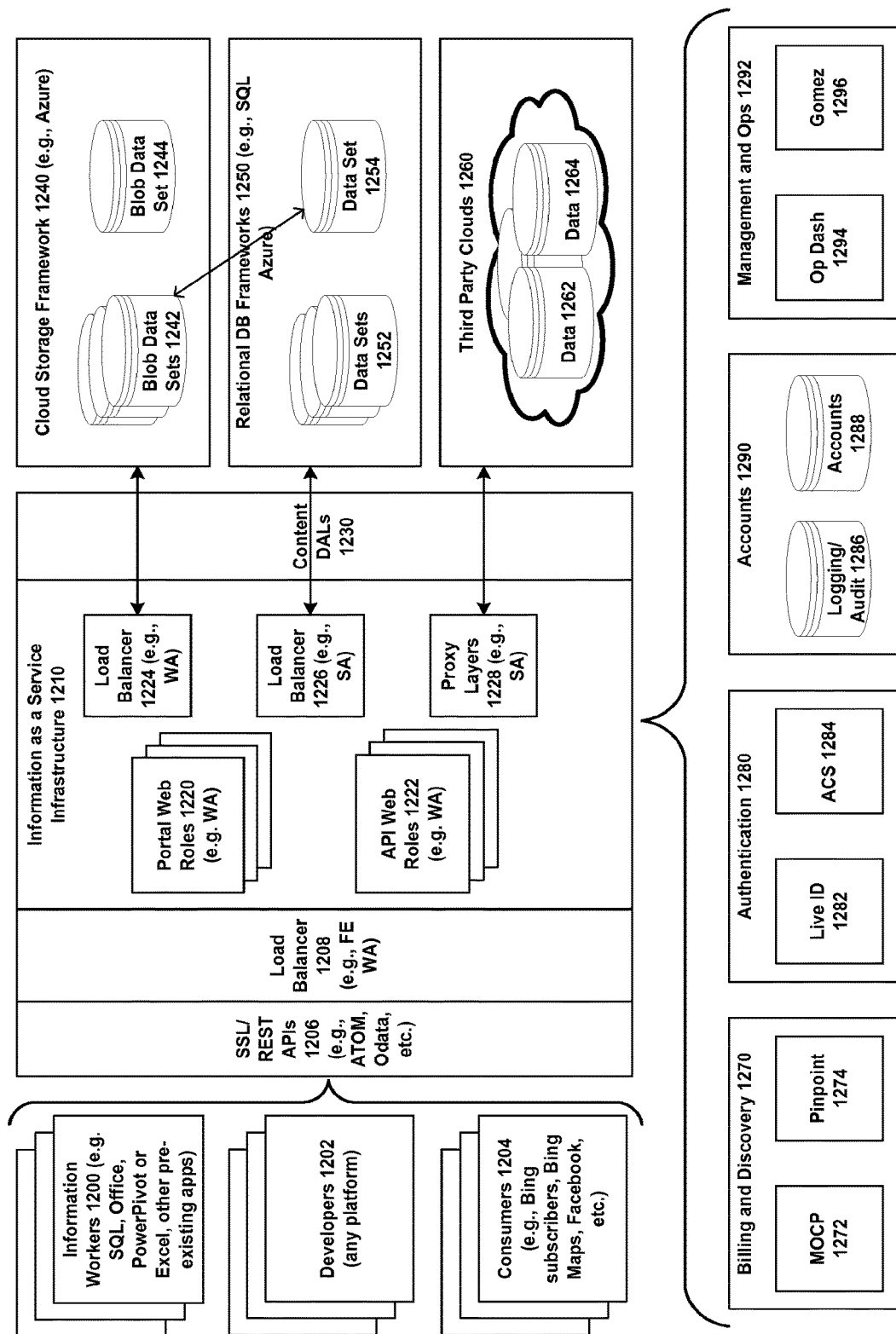
FIG. 12 is a block diagram illustrating an exemplary non-limiting set of implementation specific details for an infrastructure for information provided as a service from any platform.

FIG. 12 is an exemplary non-limiting implementation of the infrastructure 1210 for information as a service as described above according to one or more features. At the interaction side are information workers 1200, developers 1202 and consumers 1204 who can communicate with the infrastructure via SSL/REST based APIs 1206. A load balancer 1208 can be used to help steer traffic in an optimal way. In this regard, the input is routed to portal web roles 1220 or API web roles 1222. From the infrastructure 1210 to the data side is additional load balancing 1224 or 1226 (e.g., WA or SA) for access to blob data sets 1242, or blob data set 1255 of cloud storage framework 1240, or to data sets 1252 or data set 1254 of relational database frameworks 1250. Proxy layers 1228 can be used to access data 1262 or data 1264 of third party clouds 1260. Content data abstract layers (DALs) 1230 can be used to access content, where applicable. In this regard, there can be duplication or overlap of data sets across different types of storage, e.g., the same data might be represented as blob data and as structured data, e.g., SQL.

As supplemental services to the data, billing and discovery services 1270 can include online billing 1272 (e.g., MOCP) or discovery services 1274 (e.g., pinpoint) and authentication services 1280 can include credentials management 1282 (e.g., Live ID) or content authentication 1284, e.g., authenticated content services (ACS). Accounts services 1290 can include logging/audit services 1286 or account management 1288. Management and operations services 1292 can include an operations dashboard service 1294 and network operations service 1296, e.g., Gomez.

Figure 13:
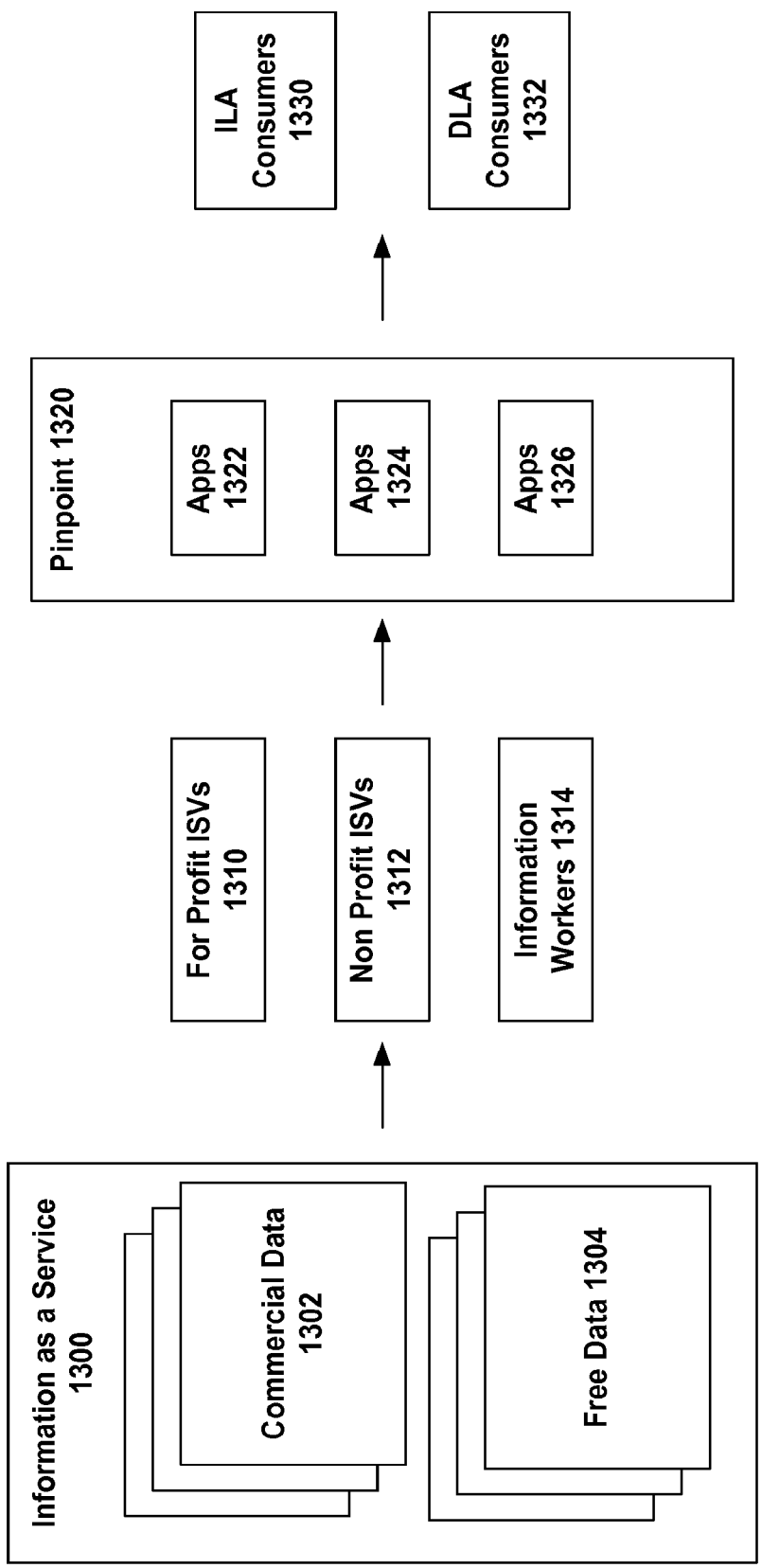
FIG. 13 is illustrative of exemplary consumption of data from an exemplary infrastructure for information provided as a service from any platform.

FIG. 13 is a block diagram illustrating an exemplary end to end flow from data to consumers of the data in accordance with one or more embodiments of the general infrastructure for enabling information as a service. For instance, information as a service 1300 can include commercial data 1302 and free data 1304, which can be of interest to various for profit developers 1310, nonprofit developers 1312 with non-profit motives and other information workers 1314 who are interested in consuming the data generally for productive goals. These entities can use discovery services 1320 to determine what applications 1322, 1324, . . . , 1326 may be of interest to them, and to ultimately transmit the data to ILA consumers 1330 and DLA consumers 1332 alike.

The Open Data Protocol

Those skilled in the art will appreciate that network interactions and information services can be practiced with a variety of computer system configurations and protocols. In this regard, one non-limiting implementation for querying and updating data that can be used in one or more embodiments described herein is the Open Data Protocol (OData).

OData is a web protocol for querying and updating data. OData applies web technologies such as HyperText Transfer Protocol (HTTP), Atom Publishing Protocol (AtomPub) and JavaScript Object Notation (JSON) to provide access to information from a variety of applications, services, and stores. For some general background, OData emerged organically based on the experiences implementing Atom-Pub clients and servers in a variety of products over the past several years. OData can be used to expose and access information from a variety of sources, including, but not limited to, relational databases, file systems, content management systems, and traditional web sites. OData has been released under the Open Specification Promise (OSP) to allow anyone to freely interoperate with OData implementations, in order to encourage growth of the ecosystem. Features of OData can be incorporated into other protocols as well to form hybrid protocols with similar functionality for querying and updating network data.

OData is consistent with the way the web works. In one aspect, OData uses universal resource identifiers (URIs) as a way to identify resources and uses an HTTP-centric protocol with a uniform interface for interacting with those resources, e.g., similar to the way that the Internet works. In one non-limiting aspect, OData builds on the conventions over HTTP popularized by AtomPub, which have simplified the process of sharing data, content and information across independently developed systems. OData defines additional conventions that implementations can optionally implement to support basic query and schema information to be exchanged. To simplify integration with HTML and JavaScript clients, OData defines an optional JSON representation of the protocol that complements the XML-based AtomPub format. As one can appreciate, additional implementation specific or other details regarding the OData protocol can be found at www.odata.org.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 14:
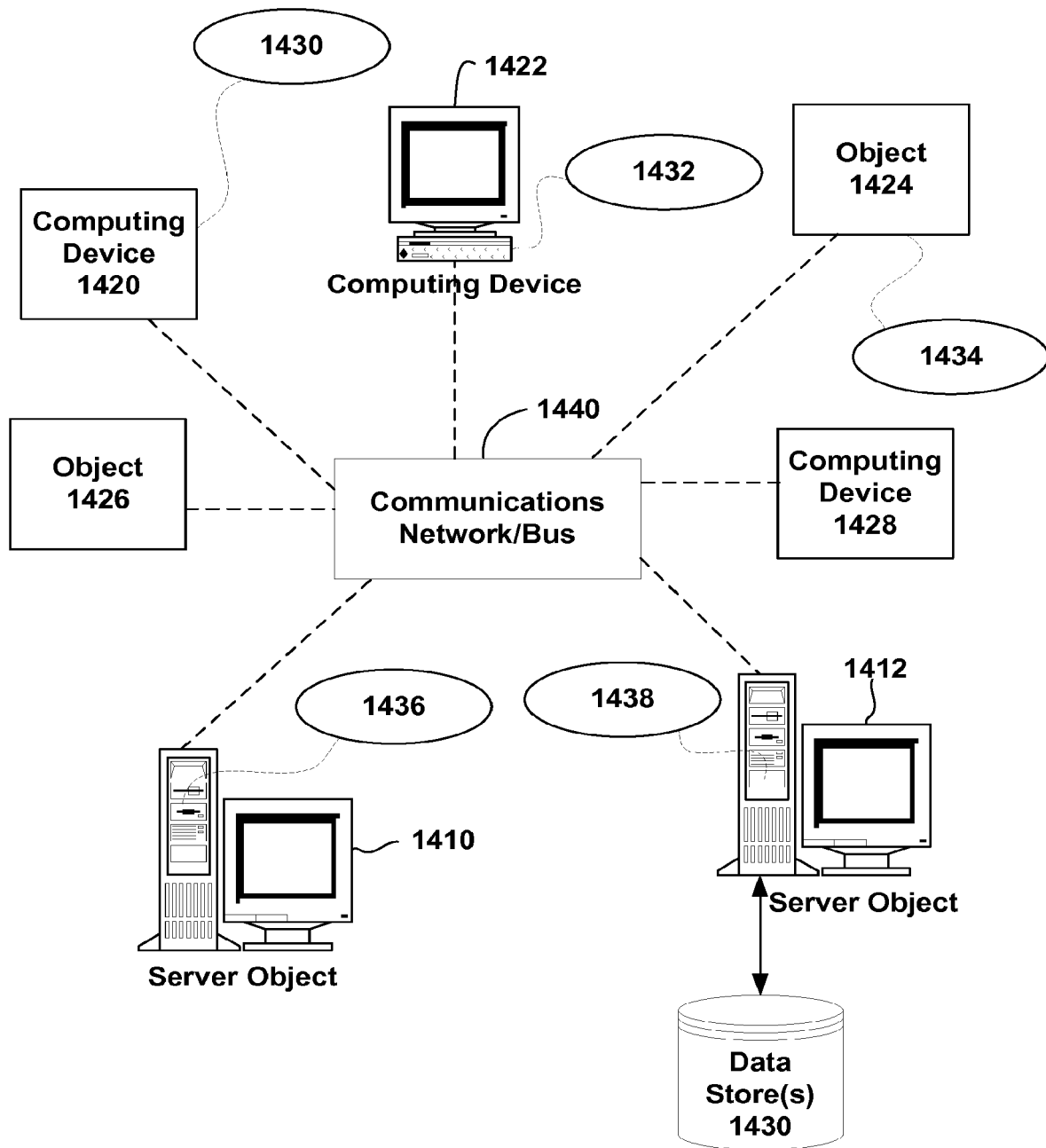
FIG. 14 is a block diagram representing exemplary non-limiting networked environments in which various embodiments described herein can be implemented.

FIG. 14 provides a non-limiting schematic diagram of an exemplary networked or distributed computing environment. The distributed computing environment comprises computing objects or devices 1410, 1412, etc. and computing objects or devices 1420, 1422, 1424, 1426, 1428, etc., which may include programs, methods, data stores, programmable logic, etc., as represented by applications 1430, 1432, 1434, 1436, 1438. It can be appreciated that computing objects or devices 1410, 1412, etc. and computing objects or devices 1420, 1422, 1424, 1426, 1428, etc. may comprise different devices, such as PDAs, audio/video devices, mobile phones, MP3 players, laptops, etc.

Each computing object or device 1410, 1412, etc. and computing objects or devices 1420, 1422, 1424, 1426, 1428, etc. can communicate with one or more other computing objects or devices 1410, 1412, etc. and computing objects or devices 1420, 1422, 1424, 1426, 1428, etc. by way of the communications network 1440, either directly or indirectly. Even though illustrated as a single element in FIG. 14, network 1440 may comprise other computing objects and computing devices that provide services to the system of FIG. 14, and/or may represent multiple interconnected networks, which are not shown. Each computing object or device 1410, 1412, etc. or 1420, 1422, 1424, 1426, 1428, etc. can also contain an application, such as applications 1430, 1432, 1434, 1436, 1438, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects or devices 1410, 1412, etc. can be thought of as servers where computing objects or devices 1410, 1412, etc. provide data services, such as receiving data from computing objects or devices 1420, 1422, 1424, 1426, 1428, etc., storing of data, processing of data, transmitting data to computing objects or devices 1420, 1422, 1424, 1426, 1428, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1440 is the Internet, for example, the computing objects or devices 1410, 1412, etc. can be Web servers with which the computing objects or devices 1420, 1422, 1424, 1426, 1428, etc. communicate via any of a number of known protocols, such as HTTP. As mentioned, computing objects or devices 1410, 1412, etc. may also serve as computing objects or devices 1420, 1422, 1424, 1426, 1428, etc., or vice versa, as may be characteristic of a distributed computing environment.

Exemplary Computing Device

As mentioned, various embodiments described herein apply to any device wherein it may be desirable to implement one or pieces of an infrastructure for information as a service from any platform. It is understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 15 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 15:
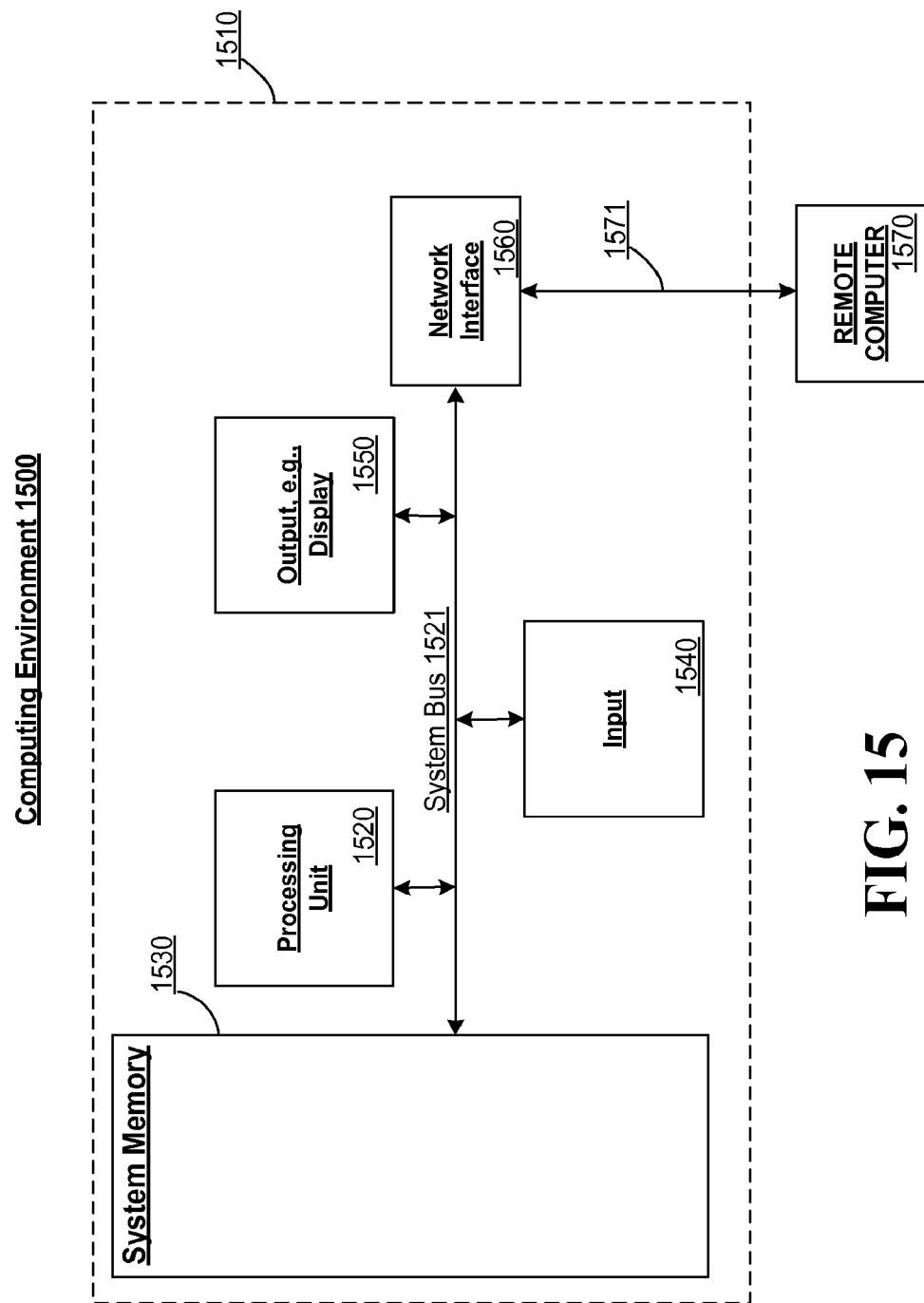
FIG. 15 is a block diagram representing an exemplary non-limiting computing system or operating environment in which one or more aspects of various embodiments described herein can be implemented.

FIG. 15 thus illustrates an example of a suitable computing system environment 1500 in which one or more of the embodiments may be implemented, although as made clear above, the computing system environment 1500 is only one example of a suitable computing environment and is not intended to suggest any limitation as to the scope of use or functionality of any of the embodiments. The computing environment 1500 is not to be interpreted as having any dependency or requirement relating to any one or combination of components illustrated in the exemplary operating environment 1500.

With reference to FIG. 15, an exemplary remote device for implementing one or more embodiments herein can include a general purpose computing device in the form of a handheld computer 1510. Components of handheld computer 1510 may include, but are not limited to, a processing unit 1520, a system memory 1530, and a system bus 1521 that couples various system components including the system memory to the processing unit 1520.

Computer 1510 typically includes a variety of computer readable media and can be any available media that can be accessed by computer 1510. The system memory 1530 may include computer storage media in the form of volatile and/or nonvolatile memory such as read only memory (ROM) and/or random access memory (RAM). By way of example, and not limitation, memory 1530 may also include an operating system, application programs, other program modules, and program data.

A user may enter commands and information into the computer 1510 through input devices 1540 A monitor or other type of display device is also connected to the system bus 1521 via an interface, such as output interface 1550. In addition to a monitor, computers may also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1571, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method performed by a management unit that manages resources for data associated with a data services provider, the method comprising:
    determining a characterization of a response performance associated with responding to a plurality of data requests initiated by one or more data processing systems;
    sending a resource request associated with the data services provider; and
    receiving a response that identifies one or more locations of one or more additional resources to be used in responding to additional data requests, the one or more additional resources being allocated for the data services provider responsive to the resource request.

2. The method of claim 1, further comprising:
    allocating the one or more additional resources responsive to the resource request.

3. The method of claim 1, further comprising:
    utilizing the one or more additional resources to provide data stored by the data services provider.

4. The method of claim 1, wherein sending the resource request comprises sending an application programming interface (API) call associated with the data services provider and wherein receiving the response comprises receiving an API response associated with the data services provider.

5. The method of claim 1, wherein the one or more additional resources that are allocated for the content provider comprise one or more additional databases.

6. The method of claim 1, wherein the determining the characterization of the response performance comprises:
    determining a tiered characterization of the response performance based on a plurality of tiered performance thresholds.

7. The method of claim 6, wherein the determining the tiered characterization of the response performance comprises detecting a triggering of a warning threshold, and wherein the method further comprises:
    sending a warning message.

8. The method of claim 6, wherein the determining the tiered characterization of the response performance comprises detecting a triggering of a mandatory scaling threshold, and wherein sending the resource request comprises sending a mandatory scaling message.

9. The method of claim 8, wherein the mandatory scaling message includes an indication of at least one of a current number of resources associated with the data, a response time associated with the triggering of the mandatory scaling threshold, or an average response time.

10. The method of claim 1, further comprising:
   detecting a triggering of a policy modification threshold; and
   in response to the detecting, modifying a cache policy associated with processing of the requests for data.

11. A system that manages resources for data associated with a data services provider, the system comprising:
   a processor component;
   a memory component that stores computer-readable instructions for execution by the processor component, the execution of the computer-readable instructions by the processor component causing the following to be performed:
      determining a characterization of a response performance associated with responding to a plurality of data requests initiated by one or more data processing systems;
      sending a resource request associated with the data services provider; and
      receiving a response that identifies one or more locations of one or more additional resources to be used in responding to additional data requests, the one or more additional resources being allocated for the data services provider responsive to the resource request.

12. The system of claim 11, wherein the execution of the computer-readable instructions by the processor component also causes the following to be performed:
   allocating the one or more additional resources responsive to the resource request.

13. The system of claim 11, wherein the execution of the computer-readable instructions by the processor component also causes the following to be performed:
   utilizing the one or more additional resources to provide data stored by data services provider.

14. The system of claim 11, wherein sending the resource request comprises sending an application programming interface (API) call associated with the data services provider and wherein receiving the response comprises receiving an API response associated with the data services provider.

15. The system of claim 11, wherein the one or more additional resources that are allocated for the data services provider comprise one or more additional databases.

16. The system of claim 11, wherein the determining the characterization of the response performance comprises:
   determining a tiered characterization of the response performance based on a plurality of tiered performance thresholds.

17. The system of claim 16, wherein the determining the tiered characterization of the response performance comprises detecting a triggering of a warning threshold, and wherein the method further comprises:
   sending a warning message.

18. The system of claim 16, wherein the determining the tiered characterization of the response performance comprises detecting a triggering of a mandatory scaling threshold, and wherein sending the resource request comprises sending a mandatory scaling message.

19. The system of claim 18, wherein the mandatory scaling message includes an indication of at least one of a current number of resources associated with the data, a response time associated with the triggering of the mandatory scaling threshold, or an average response time.

20. A computer-readable memory storing computer-executable instructions that, in response to execution by one or more processors of a management unit that manages resources for data associated with a data services provider, causes the one or more processors to perform operations including:
   determining a characterization of a response performance associated with responding to a plurality of data requests initiated by one or more data processing systems;
   sending a resource request associated with the data services provider; and
   receiving a response that identifies one or more locations of one or more additional resources to be used in responding to additional data requests, the one or more additional resources being allocated for the data services provider responsive to the resource request.

* * * * *